(No Model.)

E. MARTIN.
DRAINAGE TRAP.

No. 597,822.  Patented Jan. 25, 1898.

Witnesses:
L. C. Hills.
E. H. Bond

Inventor:
Emmett Martin,
by E. B. Stocking
Atty.

UNITED STATES PATENT OFFICE.

EMMETT MARTIN, OF FORT WAYNE, INDIANA.

DRAINAGE-TRAP.

SPECIFICATION forming part of Letters Patent No. 597,822, dated January 25, 1898.

Application filed January 16, 1897. Serial No. 619,421. (No model.)

*To all whom it may concern:*

Be it known that I, EMMETT MARTIN, a citizen of the United States, residing at Fort Wayne, in the county of Allen, State of Indiana, have invented certain new and useful Improvements in Drainage-Traps, of which the following is a specification, reference being had therein to the accompanying drawings.

This invention relates to certain new and useful improvements in drainage-traps designed especially for use in the drainage of cellars and adapted for the prevention of the flow of back or flood water from the sewer.

It has for its objects, among others, to provide a simple and cheap, yet durable and efficient, drainage-trap especially designed and adapted for use in cellars and like places, so constructed and arranged that all the parts thereof are readily accessible for cleaning or for repairs, being provided with a non-corrosive automatic valve and provision for catching and retaining the sediment, so that it can be readily removed, when desired, without disturbing the connections with the outlet-drain and effectually preventing all refuse and obstructions entering the sewer. The construction is such as to readily permit of the passage of the outflowing water, but which automatically and securely closes upon the entrance of the flow of back or flood water from the sewer, whereby its entrance into the cellar is effectually stopped. It also forms a stench-trap.

Other objects and advantages of the invention will hereinafter appear in the following description, and the novel features thereof will be particularly pointed out in the appended claims.

The invention is clearly illustrated in the accompanying drawings, which, together with the letters of reference marked thereon, form part of this specification, and in which—

Figure 1:
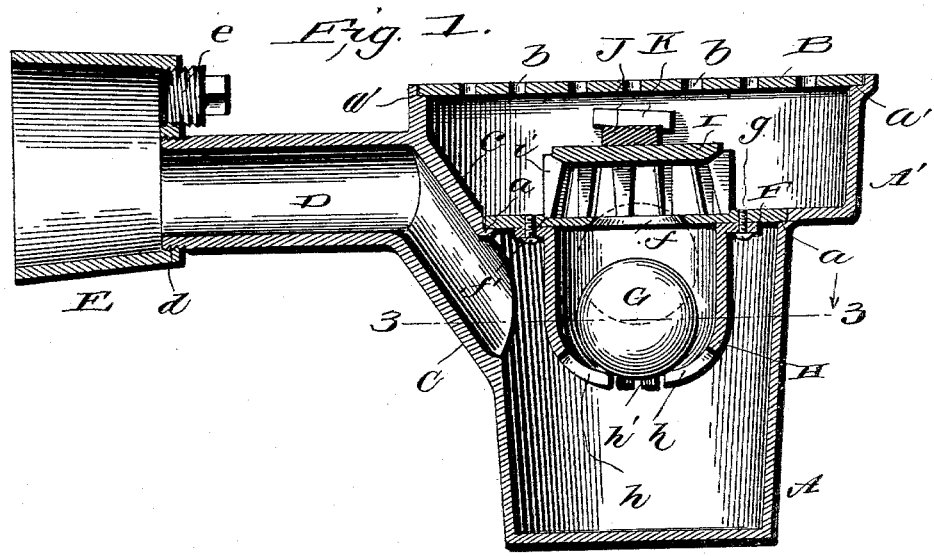
Figure 2:
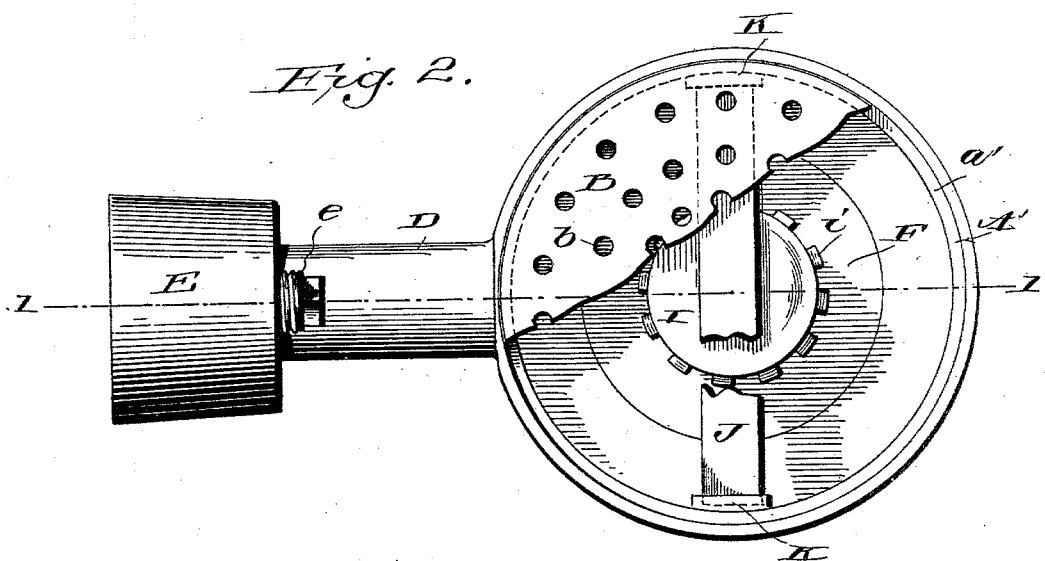
Figure 3:
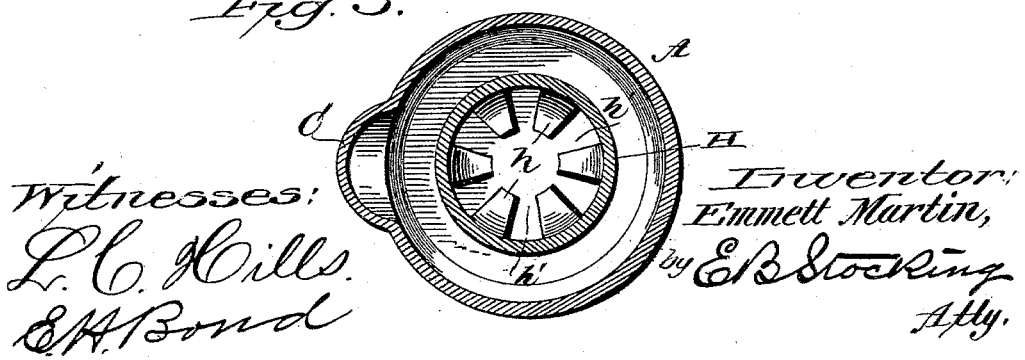

Figure 1 is a substantially central vertical section through my improved trap or drain, the section being taken on line 1 1 of Fig. 2. Fig. 2 is a plan with portions broken away; and Fig. 3 is a horizontal section on the line 3 3 of Fig. 1, looking in the direction of the arrow, with the ball-valve removed.

Like letters of reference indicate like parts throughout the several views.

Referring to the details of the drawings by letter, A designates the sink or trap, of any desired form, size, and material, preferably with its side walls slightly tapered, as shown in Fig. 1, and having at its upper end a shoulder $a$, upon which is adapted to be supported the plate hereinafter described. Above this shoulder the sink or trap is enlarged circumferentially or horizontally, as seen at A', and at its extreme upper end formed with the annular shoulder $a'$, upon which is designed to be supported the top or lid B, provided with a plurality of openings $b$ for the admission of the surface drainage of the cellar, as will be readily understood. The enlarged portion A' forms the inlet-chamber, into which the water is received from the cellar.

The sink A has projecting therefrom, at a point below the shoulder $a$, the upwardly-inclined tubular portion C, forming the outlet from that portion of the sink below the said shoulder, and the upper inclined wall $c$ thereof forms a closure for the adjacent end of the inlet-chamber A', as seen best in Fig. 1, and from thence this tubular portion extends substantially horizontally, as seen at D, and its outer end is preferably screw-threaded, as seen at $d$, to engage the threads upon the interior of the conical portion E, adapted for connection with the sewer in any of the well-known ways. This portion E is shown as provided with the removable screw-threaded plug $e$, permitting access thereto when desired.

F is a plate removably supported upon the shoulder $a$, as indicated, and having the centrally-disposed opening $f$, the walls of which are upwardly and inwardly inclined, as shown, forming a seat for the valve G, which is a floating ball-valve and preferably of rubber, although other suitable material may be employed, and this valve is normally held to the seat by the water. The cage is supported from the plate F in any suitable manner, in this instance being secured thereto by the screws $g$, and its lower portion is in the form of a grate or provided with the fingers $h$, with opening $h'$ therebetween for the passage of the water coming through the inlet-chamber or for the backflow from the sewer. This serves to retain within the cage all refuse which is of sufficient size to tend to block or check the sewer in case it should find its way thereinto. The smaller refuse and sediment finds its way through these openings $h'$ into the bottom of the sink A, from which it may be removed when desired.

I is a plate having the depending legs or fingers $i$, which rest upon the plate F, which latter is preferably formed, as seen in Fig. 1, with the annular depression forming the shoulder $f'$, against which the outer edges of these depending legs or fingers engage, so as to hold the same against movement. This plate I, with its fingers or legs, is securely yet detachably held in position by means of the bar J, which is placed across the upper face thereof and its ends then engaged beneath the inclined or cam-shaped lugs K upon diametrically opposite sides of the inlet-chamber, as seen in Figs. 1 and 2. When this bar is placed in position and turned so as to engage its ends beneath the lugs or flanges, the plate I is firmly held in position, and this bearing upon the plate F and the parts carried thereby serves to firmly hold all of said parts in their proper relation.

With the parts constructed and arranged substantially as above described, the operation will be obvious and in brief is as follows: The device is arranged so that the top B of the trap is even with or slightly below the surface of the cellar in which it is placed, and the surface water will readily flow into the chamber A' through the perforations $b$ in the said top and through the grate $i$, through the opening $f$ in the plate F into the cage H, and through the openings in the bottom thereof into the chamber therebeneath. The valve G is normally resting against the seat $f$ of the cage, as indicated by dotted lines in Fig. 1. The grate $i$ and the grated bottom of the cage serve to intercept all obstructions and also form a sufficient obstruction to the outflowing water to permit the greater part of the sediment to settle in the bottom of the sink A, from which it can be readily removed, the larger portions being collected in the chamber A'. The water thus cleaned of the sediment and other obstructions flows out through the passages C and D into the sewer, the pipe of which is connected with the conical portion E. In case of a flow of back or flood water the pressure upon the bottom of the ball G will force it and hold it to its seat and thus prevent the flood-water entering the cellar. The action of this ball-valve is positive and reliable and efficient and, being made in the form shown and of a non-corrosive material, has no working parts that require lubrication or repairs.

By removal of the bar J the grate can be taken out, and then the plate F and its cage removed and the parts all cleaned and readily inserted in position.

Modifications in detail may be resorted to without departing from the spirit of the invention or sacrificing any of its advantages.

Having thus described my invention, what I claim as new, and desire to secure by Letters Patent, is—

1. In a drainage-trap, the combination with the sink provided with inlet and settling chambers, an interposed partition-plate with valve and depending cage, a floating ball-valve supported in said cage, and a plate with depending legs removably supported upon said partition-plate, substantially as described.

2. In a drainage-trap, the combination with the sink provided with inlet and settling chambers, an interposed partition-plate with valve and depending cage, a floating ball-valve supported in said cage, a plate with depending legs removably supported upon said partition-plate, and a locking-bar engaging opposite walls of the inlet-chamber to hold the partition-plate and parts carried thereby in position, substantially as described.

3. In a drainage-trap for cellars, a sink having an enlarged inlet-chamber, a plate removably supported at the bottom of said chamber and having an opening with valve-seat, a cage supported from said plate, a ball-valve within the cage, a plate with depending legs supported on the said plate, lugs having cam-faces on the opposite, inner walls of the inlet-chamber, and locking means adapted to engage beneath said lugs to hold said plates and cage removably in position; substantially as described.

4. In a drainage-trap for cellars, a sink having an enlarged inlet-chamber, a plate removably supported at the bottom of said chamber and having an opening with valve-seat, a cage supported from said plate, a ball-valve within the cage, a plate with depending legs supported on the said plate, lugs having cam-faces on the opposite, inner walls of the inlet-chamber, and locking means adapted to engage beneath said lugs to hold said plates and cage removably in position, the first-mentioned plate being provided with an annular depression to receive the legs on the upper plate; substantially as described.

In testimony whereof I affix my signature in presence of two witnesses.

EMMETT MARTIN.

Witnesses:
ROBT. B. DREIBELBISS,
J. W. EGGEMANN.